April 23, 1963  E. D. WILKERSON  3,086,299
EDUCATIONAL DEVICE FOR DEMONSTRATING EARTH GLOBE ROTATION
Filed Nov. 19, 1958
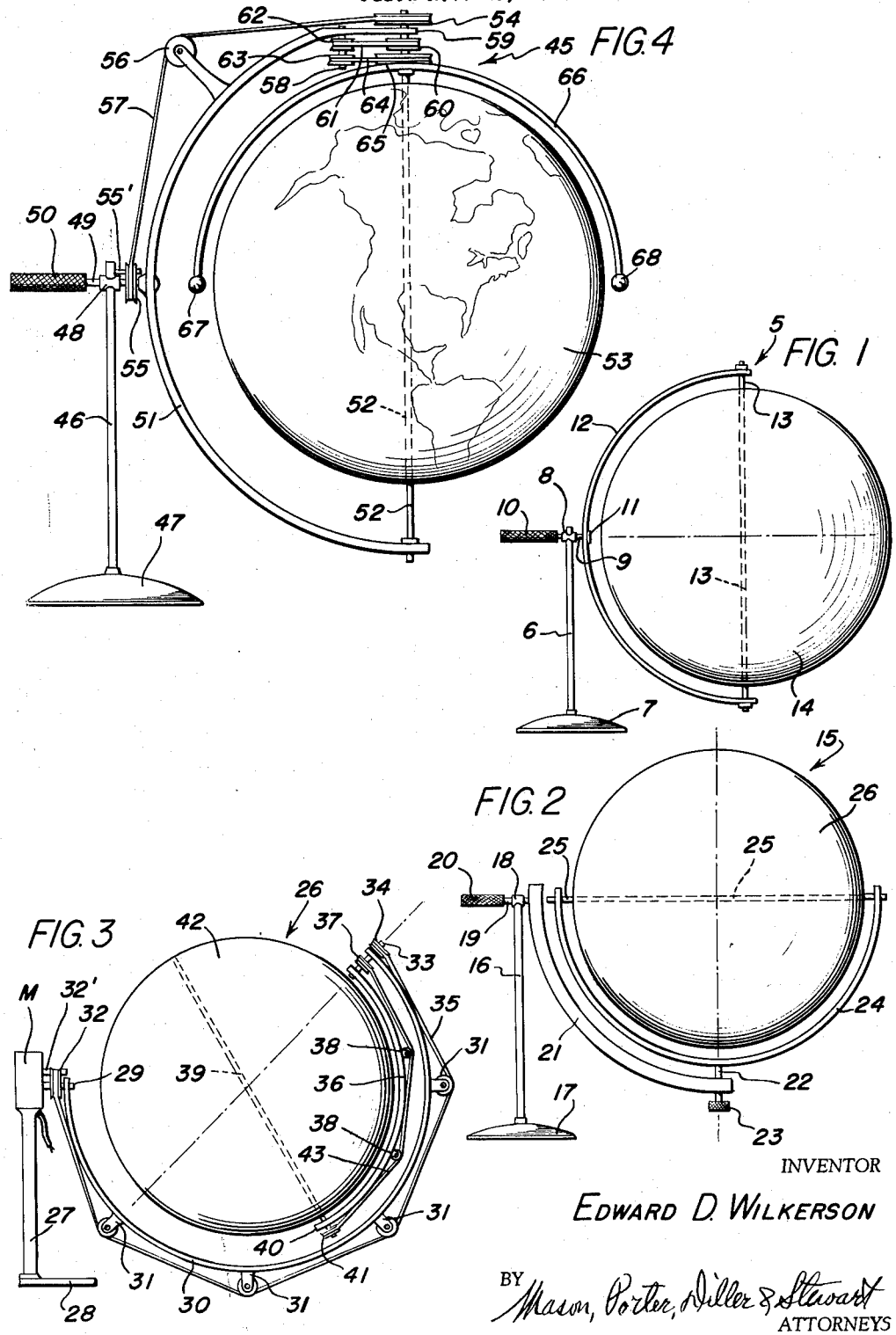
INVENTOR
EDWARD D. WILKERSON
BY
ATTORNEYS

United States Patent Office 3,086,299
Patented Apr. 23, 1963

3,086,299
EDUCATIONAL DEVICE FOR DEMONSTRATING EARTH GLOBE ROTATION
Edward D. Wilkerson, 280 E. Northfield Road, Livingston, N.J.
Filed Nov. 19, 1958, Ser. No. 774,897
5 Claims. (Cl. 35—46)

This invention relates generally to an improved device for use by instructors for demonstrating rotation of a globe representing the earth.

The complexities involving motions of a sphere and the relative positions of objects on the surface of a sphere while the sphere is in motion is often quite difficult to transmit in words to a student to whom this phenomenon is being described. The complexity of the problem is evidenced starting in the elementary classes where it is necessary to utilize a globe to impart to the students the principle of rotation of the globe about an axis of rotation as well as movement in an orbit relative to the sun, for example.

Unlike most objects which have sides, edges, etc. which can be used as reference points, the sphere has no sides, top, bottom or ends, and in fact the outer surface has no flat plane, however, this is a paradox inasmuch as the sphere contains infinite planes.

Facing the fact that the sphere does contain infinite planes, there appears to be a necessity for a simple apparatus which will afford rotation and/or movement of the sphere in all planes contained in the sphere. This appears necessary since the sphere or globe is suspended in the universe in balanced isostasy, and since this is true, it is necessary for the educators to consider the fact that the balanced isostasy of the earth permits the possibility of motion of the sphere in every conceivable direction around the center of the sphere in isostasy.

The necessity for apparatus of the character stated appears to be emphasized and made acutely obvious when one attempts to draw a silhouette of a sphere on a flat plane such as a piece of paper, and then explain, and have understood, various dimensions and motions of the sphere.

A primary object of this invention is to provide novel apparatus which includes a sphere mounted on at least two different axes of rotation, for use, say for example, in elementary school demonstrations.

Another object of the invention is to provide apparatus which includes a sphere mounted on more than two axes of rotation for demonstration purposes in more advanced study.

More particular objects of the invention will become apparent from the reading of the following description of the several preferred embodiments, the appended claims and the accompanying drawing, in which:

FIGURE 1 is an elevation of one embodiment of the novel apparatus for demonstrating rotation of a sphere about two axes;

FIGURE 2 is an elevation of another embodiment of the novel apparatus for demonstrating rotation of a sphere about three axes;

FIGURE 3 is an elevation of another embodiment, showing the manner in which power means may be utilized for rotating a sphere about three axes; and, FIGURE 4 is an elevation of still another embodiment of the novel apparatus, showing two axes of rotation of the sphere and the relative orbit of portions simulating the moon and the sun.

Referring to the drawing in detail and in particular to FIGURE 1, the most simplified version of the demonstration apparatus is indicated generally at 5 and includes a vertical support rod or standard 6 secured at its lower end in a suitably weighted base 7. Extending transversely of the upper end of the support rod 6 is a sleeve 8 in which is journalled a support shaft 9. Secured to one end of the shaft 9 adjacent one end of the sleeve 8 is a knurled handle 10 which may be finger manipulated to bring about rotation of the shaft in the sleeve. Secured to the opposite end of the shaft 9 by peening over the end as indicated at 11 or in any other approved manner is a semi-circular yoke or carrier 12 which has co-axial apertures in its terminal ends forming trunnion bearings for a shaft 13 which has a globe or sphere 14 mounted thereon.

The shaft 9 defines one axis of rotation and the shaft 13 defines a second axis of rotation of the sphere. The knurled handle 10 may be rotated by one hand of a user around the axis defined by shaft 9, and the sphere also may be rotated about the axis of rotation defined by the shaft 13 by contact of the other hand of the user.

Referring to FIGURE 2, an embodiment illustrating three axes of rotation is indicated generally at 15 and includes a support rod or standard 16 mounted on a suitably weighted base 17. Journalled in a sleeve 18 transversely of the upper end of the rod 16 is a support shaft 19 which has a knurled handle 20 secured at one end. Mounted on the other end of the shaft 19 is one end of an arcuate yoke or carrier 21 having about 90 degrees of curvature. A second shaft 22 is journalled transversely of the other end of the yoke 21, or uprightly, and has secured to its lower end a knurled knob 23. The other end of the shaft 22 has secured thereto a semi-circular yoke or carrier 24 which has mounted in co-axial apertures through opposite ends thereof a shaft 25. The shaft 25 has journalled thereon a sphere or globe 26.

This model, it will be observed may be used to demonstrate simultaneous rotation of the sphere about three axes of rotation defined by shafts 19, 22 and 25. The sphere may be rotated about its shaft 25, the shaft 22 and yoke 24 thereon may be rotated to impart a second axis rotation to the sphere, and the carrier 21 may be rotated about the axis defined by shaft 19 to impart a third axis rotation. It will be noted that the axis of rotation defined by the shaft 25 of the carrier 24, at certain times will coincide with the axis of rotation defined by the shaft 19, this condition being shown in FIGURE 2.

Referring to FIGURE 3, a power driven embodiment of the apparatus is indicated generally at 26, this embodiment showing three axes of rotation. A support tube or standard 27 is secured to a suitable base 28. Fixed to the upper end of the tube 27 is an electric motor M including an extending drive shaft 29. Fixed to the terminal end of the shaft 29 is one end of an arcuate yoke or carrier 30 which has fixed thereon in spaced relation, outwardly extending double sheaves or idler pulleys 31. Free on shaft 29 between the motor M and the end of the yoke 30 is a sheave or pulley 32 which is retained against rotation by a suitable pin 32′ extending laterally from the motor M. Journalled transversely through the other end of the yoke 30 is a shaft 33 having secured to its upper or outer end a pulley or sheave 34. An endless belt 35 is entrained over sheaves 32, 31 and 34. A second yoke or carrier 36 is fixed to the inner terminal end of the shaft 33. Between the ends of the yokes 36 and 30 which carry the shaft 33 a drive sheave or pulley 37 is secured on said shaft. A plurality of double, spaced sheaves 38 extend in spaced relation from the outer surface of the yoke 36 and an elongated shaft 39 is rotatably supported at the end 40 of the yoke 36. The shaft 39 has a sheave 41 fixed to its end between the yokes 30 and 36, and fixed on the shaft 39 is a sphere or globe 42. An endless belt 43 is entrained over the sheaves 37, 38 and 41 so that rotation of the shaft 33 will be imparted to the shaft 39 and the sphere therein.

Rotation of the drive shaft 29 provides rotation of the sphere 42 about a first axis of rotation, this being the axis of the shaft 29. As the shaft 29 and the carrier 30 are rotated the stationary sheave 32 and the belt 35 cause the sheave 34 and shaft 33 to rotate due to relative movement of the yoke 30 and the shaft 33, and thus the second axis of rotation is defined by the shaft 33. Rotation of the shaft 33 causes the shaft 39 to be rotated by means of the belt 43 and sheaves 37, 38 and 41, the shaft 39 defining the third axis of rotation of the sphere.

Considering FIGURE 4, an embodiment showing two axes of rotation is indicated generally at 45 and includes a support rod or standard 46 fixed at its lower end in a suitable base 47. A tubular sleeve 48 extends transversely of the upper end of the rod 46 which has journalled therein a support shaft 49, this shaft having a knurled handle 50 fixed to one end. Fixed to the other end of the shaft 49 is a semi-circular yoke or carrier 51 which provides trunnion bearings at its ends for a support shaft 52. Fixed on the shaft 52 is a sphere or globe 53 which will rotate with shaft 52, and the upper end of the shaft 52 has secured thereto a sheave 54. A sheave 55 is secured on the shaft 49 and is retained against rotation by a pin 55' extending laterally from the rod 46. The carrier 51 has a double sheave or idler 56 mounted thereon, and an endless belt 57 is entrained over the sheaves 54, 55 and 56.

Depending from an intermediate portion of the yoke 51 parallel to the shaft 52 is a suitably journalled shaft 58. Fixed to the shaft 52 below the end 59 of the yoke 51 is a sheave 60 drivingly connected to shaft 58 by an endless belt 61 engaging about the sheave 62 fixed on said shaft 58. A second sheave 63 is fixed on the shaft 58 adjacent the lower end thereof and is drivingly connected by a belt 64 to a larger sheave 65 journalled on the shaft 52. The sheave 65 is secured to a semi-circular yoke or frame 66 which is disposed concentric to the sphere 53. The terminal ends of the yoke 66 may include thereon small spheres 67 and 68 respectively, simulating the moon and the sun.

As the handle 50 and shaft 49 are rotated by finger gripping and turning of said handle, the carrier 51 will be rotated about the axis of shaft 49. Simultaneously, the sheave 55, held against rotation by the pin 55', and the belt 57 will cause rotation of the shaft 52 due to movement of the yoke 51 and sheave 54 relative to said sheave 55 and the shaft 52 and the sphere will be rotated to define the second axis of rotation about the axis of said shaft 52. While these movements are occurring, the carrier or yoke 66 will be rotated about the sphere 53 and shaft 52 through the sheave 60, belt 61, sheaves 62, 63, belt 64 and the sheave 65 which is secured to said yoke.

The construction shown embodies the invention in several preferred forms, but it is intended that the disclosure be illustrative rather than definitive, the invention being defined in the appended claims.

I claim:

1. An educational device for demonstrating rotation about a plurality of different axes of a sphere representing the earth, said device comprising a support, a support shaft journalled on said support and defining a first axis of rotation, a carrier fixed to said support shaft and rotatable therewith about said first axis of rotation, a second shaft on said carrier and defining a second axis of rotation angularly related to said first axis of rotation, a second carrier fixed to said second shaft and rotatable therewith about said second axis of rotation, said second shaft being journalled on said first carrier, a third shaft on said second carrier and defining a third axis of rotation in angular relation to said second axis of rotation, all of said axes of rotation being always disposed in angular relation to one another, a sphere turnable about said third axis whereby said carriers and sphere can be simultaneously turned about one of said axes of rotation, all of said axes of rotation intersecting at the center of said sphere and thusly being axes of said sphere, and single power means operatively connected to said shafts for imparting simultaneous rotation to said carriers and sphere about said axes of rotation.

2. An educational device for demonstrating rotation about a plurality of dfferent axes of a sphere representing the earth, said device comprising an earth simulating sphere, a yoke extending partially about the sphere in concentric relation thereto, shaft means for supporting the sphere for rotation about an axis on said yoke, means supporting the yoke for rotation about an axis bearing angular relation to said first named axis, an arcuate support partially surrounding the yoke and sphere in concentric relation thereto and carrying the yoke supporting means at one end thereof, means for imparting rotation to the yoke on said supporting means to cause the first named shaft means to turn end over end, means for supporting the other end of the arcuate support for rotation about a third axis bearing angular relation to said second named axis, all of said axes of rotation intersecting at the center of said sphere and thusly being axes of said sphere, and means for turning said arcuate support about said third axis, the rotation imparting means and the means for turning the arcuate support including a motor and belt-and-pulley drive.

3. An educational device for demonstrating rotation about a plurality of different axes of a sphere representing the earth, said device comprising an earth simulating sphere, a yoke extending partially about the sphere in conecntric relation thereto, shaft means for supporting the sphere for rotation about an axis on said yoke, means supporting the yoke for rotation about an axis bearing angular relation to said first named axis, an arcuate support partially surrounding the yoke and sphere in concentric relation thereto and carrying the yoke supporting means at one end thereof, means for imparting rotation to the yoke on said supporting means to cause the first named shaft means to turn end over end, means for supporting the other end of the arcuate support for rotation about a third axis bearing angular relation to said second named axis, and means for turning said arcuate support about said third axis, the rotation imparting means and the means for turning the arcuate support comprises a motor and belt-and-pulley drive including a stationarily supported pulley which causes the belt to move and impart rotation to other pulley means incidental to the turning of the yoke and arcuate support, all of said axes of rotation intersecting at the center of said sphere and thusly being axes of said sphere.

4. An educational device for demonstrating rotation about a plurality of different axes of a sphere representing the earth, said device comprising a support, a drive shaft carried by said support for rotation, a yoke secured to said drive shaft for rotation therewith, a first driven shaft supported by said yoke for rotation and at an angle to said drive shaft, first drive means carried by said yoke and extending between said drive shaft and said first driven shaft for rotating said first driven shaft in response to rotation of said drive shaft, an arcuate support secured to said first driven shaft for rotation therewith, a second driven shaft supported by said arcuate support for rotation and at an angle to said first driven shaft, an earth simulating sphere secured to said second driven shaft for rotation therewith, and second drive means carried by said arcuate support and extending between said first and second driven shafts for rotating said second driven shaft.

5. A device as defined in claim 4 wherein said first and second drive means are of the belt-and-pulley type and include a pulley rotatably journalled on said drive shaft, and means carried by said support engaging said pulley and preventing rotation thereof.

(References on following page)

References Cited in the file of this patent

UNITED STATES PATENTS

| | | |
|---|---|---|
| 895,020 | Hughes et al. | Aug. 4, 1908 |
| 958,139 | Laing | May 17, 1910 |
| 1,042,456 | Manson | Oct. 29, 1912 |
| 1,384,801 | Ferrari | July 19, 1921 |
| 2,182,334 | Crespo | Dec. 5, 1939 |
| 2,532,402 | Herbold | Dec. 5, 1950 |
| 2,883,768 | Fraser | Apr. 28, 1959 |

FOREIGN PATENTS

| | | |
|---|---|---|
| 934,306 | France | May 19, 1948 |